No. 745,972. PATENTED DEC. 1, 1903.
F. A. ROBINSON.
MACHINE FOR FILLING AND SEALING CONCEALS.
APPLICATION FILED MAR. 19, 1903.
NO MODEL. 3 SHEETS—SHEET 1.
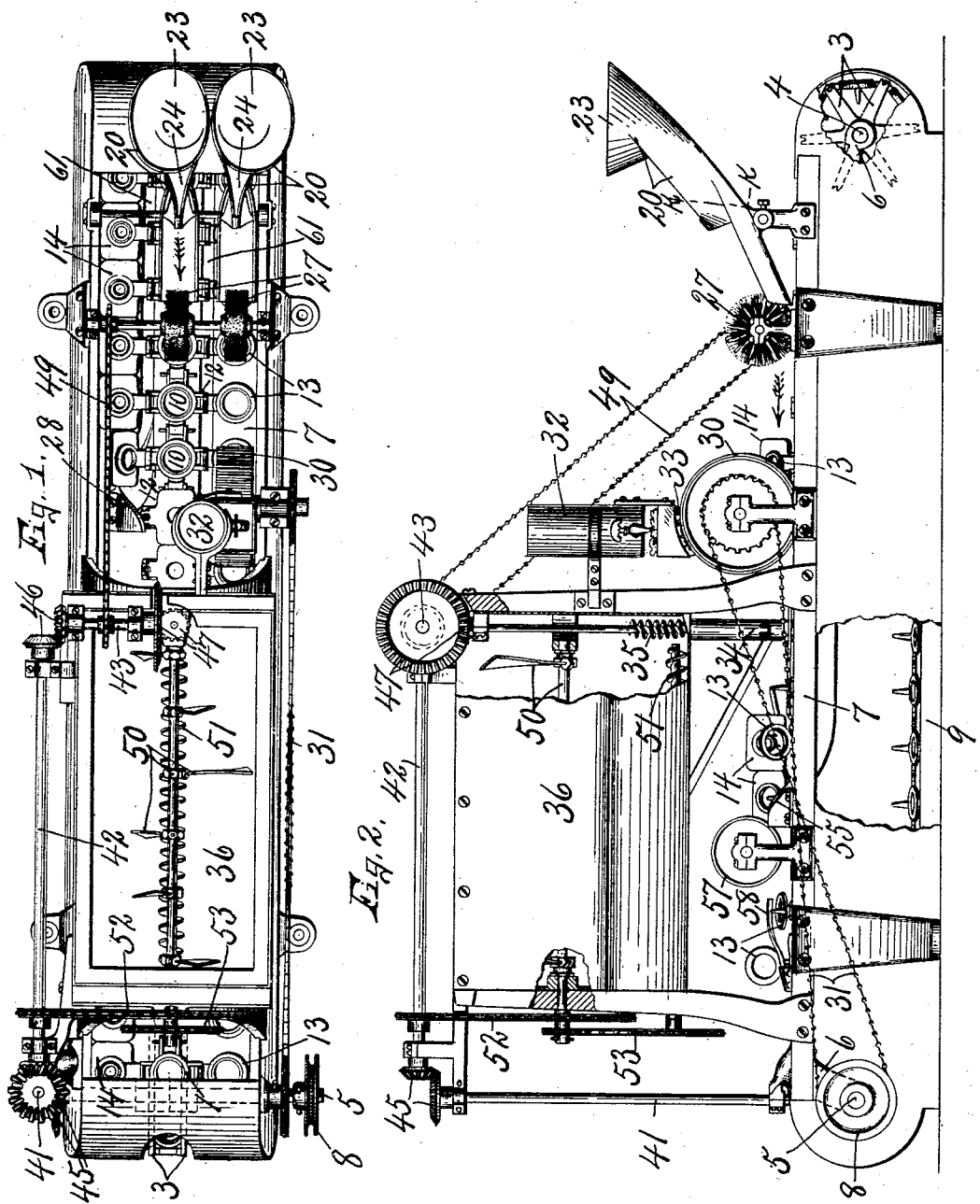
WITNESSES:
INVENTOR
Frank A. Robinson
BY
Howard P. Denison
ATTORNEY No. 745,972. PATENTED DEC. 1, 1903.
F. A. ROBINSON.
MACHINE FOR FILLING AND SEALING CONCEALS.
APPLICATION FILED MAR. 19, 1903.
NO MODEL. 3 SHEETS—SHEET 2.
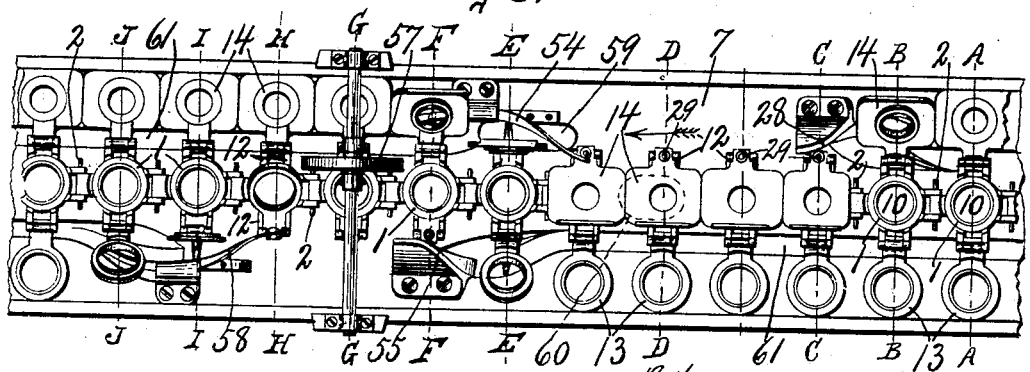
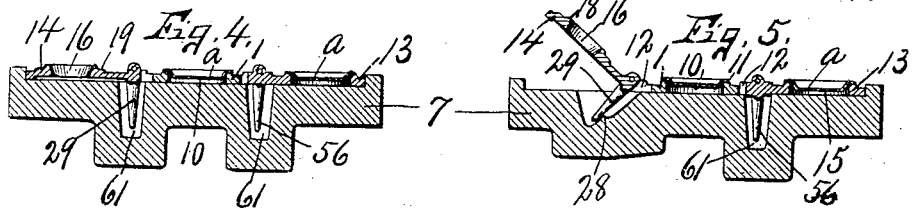
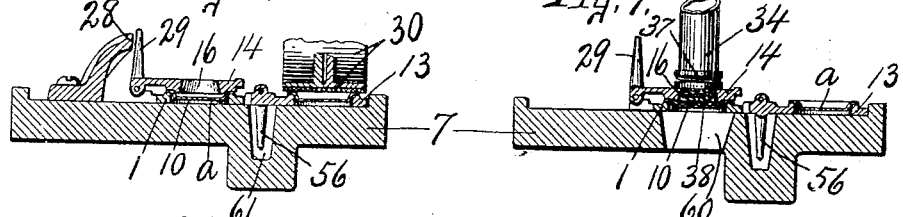
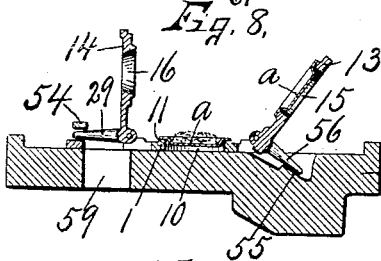
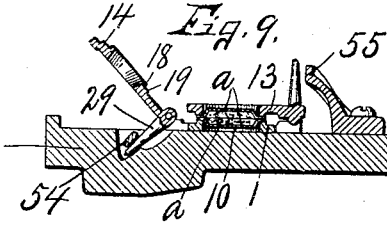
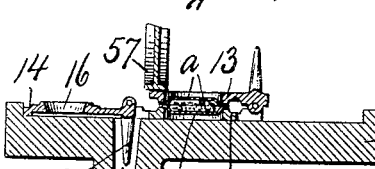
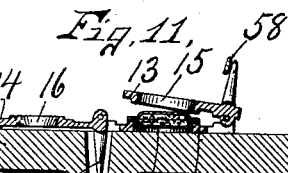
WITNESSES:
INVENTOR.
Frank A. Robinson
BY
Howard P. Denison
ATTORNEY.

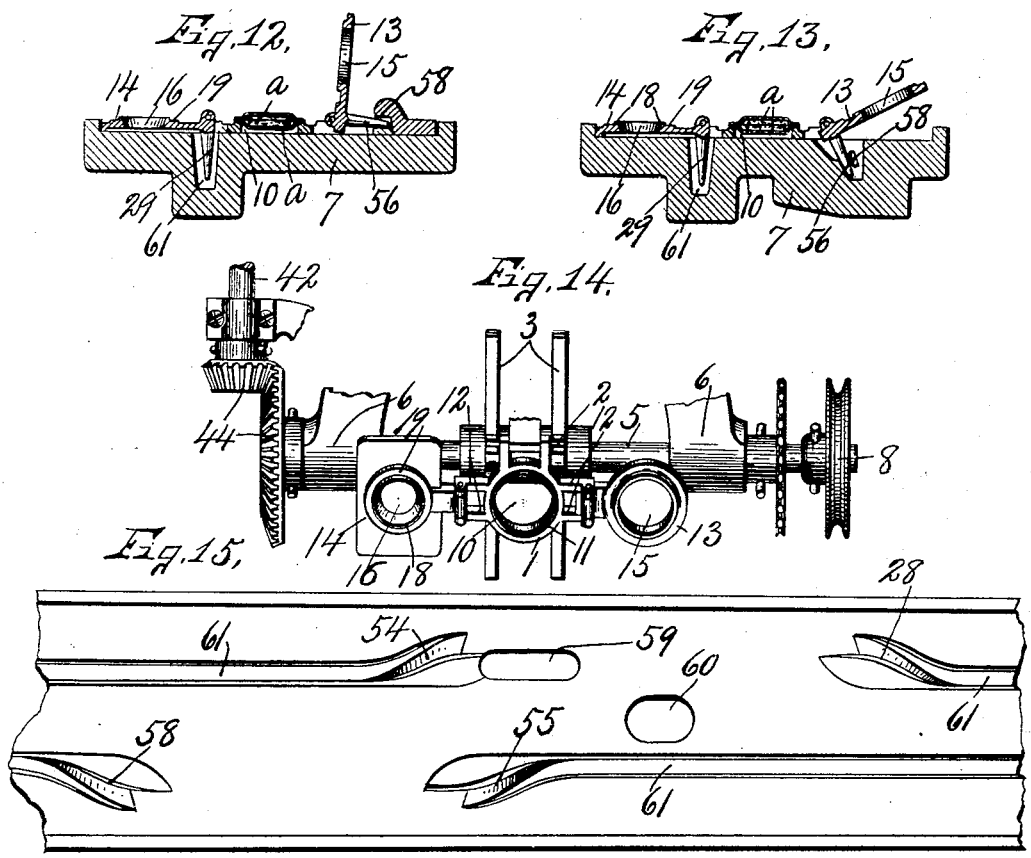

No. 745,972. Patented December 1, 1903.

UNITED STATES PATENT OFFICE.

FRANK ALEXANDER ROBINSON, OF SYRACUSE, NEW YORK.

MACHINE FOR FILLING AND SEALING CONCEALS.

SPECIFICATION forming part of Letters Patent No. 745,972, dated December 1, 1903.

Application filed March 19, 1903. Serial No. 148,487. (No model.)

*To all whom it may concern:*

Be it known that I, FRANK ALEXANDER ROBINSON, of Syracuse, in the county of Onondaga, in the State of New York, have invented new and useful Improvements in Machines for Filling and Sealing Conceals, of which the following, taken in connection with the accompanying drawings, is a full, clear, and exact description.

This invention relates to improvements in machines for filling and sealing conceals. These conceals usually contain a medicine, powder, or similar material and are composed of cup-shaped wafers or disks of soluble matter, preferably of some starchy or albuminous substance which when moistened is more or less adhesive, so that after the powder is placed in one of the disks and the meeting edges of one or the other of the disks are moistened when the two disks are brought together face to face they will readily adhere and form a closed packet for the powder, which may be taken into the mouth, readily dissolved, and swallowed.

The object of the present invention is to provide means whereby the conceals are automatically, rapidly, and economically filled and sealed with the employment of a minimum amount of labor—that is, the cup-shaped disks are fed automatically and promiscuously to a moving carrier consisting of a series of folding sections arranged in pairs, each pair having a receptacle for its particular disk by which the disks are conveyed to an automatic filler, where a definite quantity of the material is discharged into one of the disks. The other disk is moistened and is then folded over upon the disk containing the powder, the moistened surface causing the disks to adhere to each other for completing the conceal, after which it is discharged from the machine in a finished condition ready to be boxed for the consumer's use.

Further objects will appear in the following description.

In the drawings, Figures 1 and 2 are respectively top plan and side elevation of a machine embodying the various features of my invention, portions of the device being broken away in Fig. 2 for disclosing the interior mechanism. Fig. 3 is a top plan of a portion of the endless chain or carrier for forming the conceals, showing also the means for operating the folding links and the pressure device for bringing the conceal sections or disks into closer contact with each other after being moistened. Figs. 4, 5, 6, 7, 8, 9, 10, 11, 12, and 13 are cross-sectional views taken, respectively, on lines A A to J J. Fig. 14 is an end rear view of the portion of the machine seen in Figs. 1 and 2, showing particularly the driving mechanism for the endless carrier. Fig. 15 is a top plan of a portion of the supporting-bed for the endless carrier, showing particularly the ways or guides for operating the folding links for conceal-supports. Figs. 16 and 17 are similar sectional views taken, respectively, on line K K, Fig. 2. Fig. 18 is an enlarged detail view of the mutilated gears for intermittently operating the vertical screw-feed which feeds a definite quantity of powder to one of the disks. Fig. 19 is a vertical sectional view of the lower portion of the filler.

Similar reference characters indicate corresponding parts in all the views.

A series of horizontally-disposed disks supporting members 1 are linked together by pivotal pins 2 around a pair of rotary spiders or sprockets 3 to form an endless carrier, these spiders or sprockets being mounted upon rotary shafts 4 and 5, which are journaled in suitable bearings 6 at the opposite ends of a fixed substantially flat bed or table 7. The members 1 of the upper portion of the carrier ride upon the top face of the bed or table 7 and are actuated from front to rear in the direction indicated by the arrows, Figs. 1 and 2, by means of the rear sprocket 3, the shaft 4 being driven by a pulley 8, which may be connected to any available source of power, (not shown,) or it may be driven manually, if desired. The lower portion of the carrier of course travels forwardly and rides upon the upper flat face of an underlying bed 9, which relieves the sag and consequent weight of the carrier and reduces its tendency to stretch. In order that the action of the carrier may be positively and accurately timed with the other moving parts of the machine, the pivotal pins connecting adjacent members 1 are projected a short distance at each end and the arms of the sprockets 3, of which there are two at each end of the machine, are grooved and arranged to receive the projections of the successive pins 2. It is now seen how the carrier members are connected, supported, and moved along the bed 7, and inasmuch as all of these members are alike in construction and function it will be necessary to describe only one of them. This member 1 is provided with a circular opening 10 and an annular rib 11, the opening 10 receiving the bowl of the disk and the rib 11 forming a seat for the flange of the disk, whereby it is held in operative position for receiving the material to be concealed and permitting the application of the other disk thereto. The front and rear ends of the disk are formed with apertured lugs or ears, which intermesh with those of adjacent members to receive the pivotal pins 2, while the lateral sides of these members are formed with oppositely-projecting apertured ears 12, to which are pivotally attached oppositely-folding members 13 and 14. These members 13 and 14 are provided with central openings 15 and 16 and are arranged to fold over and upon the members 1, so that their openings are in exact alinement with the openings in the members 1.

The member 13 is very similar to the central member 1 and serves to carry the other disk to form the complete conceal, the opening 15 being of the same size as the opening 10 and receives the second disk and is surrounded by a raised annular rib for engaging the flange of the second disk and holding the latter in position.

The member 14 forms what may be termed a "gaging" plate or cap and is brought over and upon the disk in the member 1 just before passing under the filler, so that only a definite predetermined quantity of powder proportionate to the capacity of the opening 16 may be introduced into the disk. This opening 16 is necessarily smaller than the bowl of the disk and is slightly tapering, so that when the member 14 is folded over upon the disk the larger end of the opening is nearest the bottom of the bowl of the disk, said member 14 being formed with a tapering annular flange 18 and a raised pressure-face 19, the flange 18 entering the bowl of the disk, and the face 19 operates to impinge the flange of the disk against its supporting-rib on the member 1, so that the powder is entirely confined within the bowl. It is thus seen that the members 1, 13, and 14 form together an individual holder and folder for the opposite disks of a complete conceal and that the operation of each of these holders as it passes from the front to the rear of the machine along the bed 7 is the same, each operating to form a conceal, and as many conceals are formed at each cycle of movement of the carrier as there are holders. When the holders enter upon the front end of the table or bed 7, the members 13 and 14 are extended or unfolded and lie flatwise upon the bed at opposite sides of the central member 1, the conceal-disks being automatically fed into the members 1 and 13 while in this extended position. These disks are fed somewhat promiscuously by an attendant into a pair of chutes or righting devices 20, which are located side by side upon and above the bed 7 and through which the disks slide or roll edgewise by gravity to their respective carrier members 1 and 13. The upper end of each chute is enlarged and hopper shape at 23 to receive the disk in any position and is gradually drawn in or flattened from the base of the hopper downwardly, so as to form a vertical narrow channel 24 a little wider than the depth of the conceal-disk, and this channel terminates in diverging grooves 25, which are separated by a switch-point 26, gradually flattened horizontally toward the discharge end of the chute. As the individual disks pass from the hopper 23 they are brought to an upright position by the walls of the channel 24 and are switched to one or the other of the grooves 25, according to which side the flange of the disk is on, by the point 26 in a manner similar to the switching of a car-wheel, and the bowl of the disk being the heavier it is evident that the disk will always fall right side up on the flat discharge end of the chute. As soon as the disks reach the discharge end of the chute they are drawn onto their respective members 1 and 16 by intermittently-rotating sweeps or brushes 27, which are mounted on the bed 7 and actuated to deposit the disks of one conceal onto one holder at the same time that the disk of another holder is being filled with powder. Immediately after the disks for each conceal are thus deposited in their respective members 1 and 13 and before reaching the filler, presently described, the gaging cap or plate 14 is folded over and upon the disk in the member 1 by means of a cam or track 28 on the bed 7, and an arm 29, depending from the member 14, which arm rides against the cam as the carrier continues to move from front to rear of the bed, as seen in Figs. 3 to 6. About this time or just before the disk is carried under the filler-tube the meeting face of the disk in the member 13 is moistened by a rotary moistening-roller 30, which is mounted on the bed 7 and is driven from the shaft 5 by a chain or belt 31, so that the contiguous faces of the carrier and roller move in the same direction, the roller receiving moisture from a water-reservoir 32 through the medium of an absorbent 33.

The gaging cap or plate 14 remains in its folded position upon the disk while passing under a suitable filler, which is here shown as consisting of a tubular spout or nozzle 34 and a screw-feed 35, rotating intermittently within the nozzle. This nozzle receives the powder or other matter which is to be concealed from a superimposed hopper or receptacle 36, and its lower end lies in close proximity to the upper face of the member 14 when the latter is passing under the former, so that no powder may be wasted by leakage between the parts, said lower end being provided with fixed and movable collars 37 and 38 and an interposed spring 39, which operates to yieldingly hold the movable collar against the carrier members 14, these latter members being formed with forwardly-projecting shoes 40 to insure the safe passage of the carrier under the filler. The screw-feed 35 extends from the lower end of the filler into the interior of the receptacle 36 and is driven from the main driving-shaft 4 through the medium of a vertical shaft 41 and horizontal shafts 42 and 43, the shaft 4 being connected to the main shaft 5 and horizontal shaft 42 by common bevel-gears 44 and 45, while the other horizontal shaft 43 is connected to the shaft 42 by mutilated gears 46 and to the upright shaft of the screw 35 by bevel-gears 47. These several gear connections are so related or timed with the movement of the carrier that as each conceal-holder is successively alined with the discharge end of the filler the screw 35 is instantly rotated one complete revolution and discharges a quantity of powder into the underlying disk proportionate to the capacity of the spiral space between the blades of the screw in one complete turn or helix, which corresponds with the capacity of the conceal and is usually of a definite number of grains. The mutilated gears 46 operate the screw-feed 35 intermittently and only when the disks to be filled are successively alined with the filler, the screw 35 being at rest at other times. This is also true of the brushes or sweeps 11, which are actuated by a chain belt 49, connecting the brush or sweep shaft with the shaft 43, as seen in Figs. 1 and 2.

The material or powder is placed in bulk in the receptacle 36 and is agitated and fed to the filler-nozzle or screw-feed 35 by an agitator 50 and a horizontal screw-feed 51 in the base of the receptacle, the agitator being driven directly from the shaft 42 by a belt 52, and the screw 51 is driven from the agitator-shaft by a belt 53, both being timed to feed the necessary amount of powder to the screw 35 without choking or conjesting the inlet of the filler. It is now apparent that one of the disks of each holder is filled and the other disk is moistened ready to be applied to the filled disk as each holder is successively presented to the filler. As the carrier continues to move the filled disk and its mate from the filler the gaging-cap 14 is folded backwardly from the member 1 to its normal position by a cam or track 54 acting against the arm 29 at and about the same time the member 13, with its disk *a*, is folded over and upon the filled disk *a* of the member 1 by means of a cam or track 55, operating against an arm 56, which is similar to the arm 29 of the cap 14 and depends from the member 13. This operation brings the meeting faces of the disks together and seals them with the powder therein, and as the carrier continues to move toward the rear the free edge of the folded member 13 rides under a pressure-roller 57, which is journaled on the frame above the bed, Figs. 2, 3, and 10, and serves to press the disks more closely together to fix the seal. During the further movement of the carrier the members 13 are folded backwardly to their normal positions by means of a cam or track 58, operating against the arm 56, and the filled conceal is then completed and automatically drops from the member 1 as it passes downwardly over the rear sprocket, the completed conceals being then boxed or packed in any desired manner.

In order that the surface of the table may be freed from any powder which may accidentally escape from the filler, said table is formed with a suitable opening 59, which is located at a point where the cap 14 is folded backwardly and extends vertically through the bed, so that the powder may be collected at the bottom and replaced in the main receptacle, a similar opening 60 being provided beneath the filler.

Alined with the several cams or tracks which operate the members 13 and 14 are grooves 61 in the upper face of the table or bed to receive the depending arms 29 and 56 and prevent undue vibration of the members 13 and 14.

Having thus described my invention, what I claim, and desire to secure by Letters Patent, is—

1. In a machine for filling and sealing conceals, a filler including a powder-feeding device, means to feed the disks to be filled one by one to the filler, the powder-feeding device being connected to the disk-feeding device whereby the disks are filled as they are successively presented to the filler.

2. In a machine for filling and sealing conceals, the combination of a cam and a disk-holder, one of the parts being movable relatively to the other, and means to actuate the moving part, the disk-holder having a folding section carrying one of the disks and the cam operating to fold said section over and upon the other section.

3. In a machine for filling and sealing conceals, a cup-shape disk and a moving support therefor, means to actuate the support, a filler discharging into the disk while in motion, a second disk and automatic means to apply it to the former disk to form the conceal.

4. In a machine for filling and sealing conceals, two disk-supporting sections, the disk of one section receiving the material to be concealed, the means operating to automatically fold one section over and upon the other to apply one disk to the other to form the conceal.

5. In a machine for filling and sealing conceals, two moving disk-supporting sections and means to actuate them, one of the disks receiving the material to be concealed, and means to automatically fold one section with its disk over and upon the other disk while the sections are moving.

6. In a machine for filling and sealing conceals, two members hinged together, a cup-shape disk in each member, means to feed the material to be concealed into one disk, and means operating to fold one member with its disk over and upon the other disk to form the conceal.

7. In a machine for filling and sealing conceals, two moving members hinged together and means to move the members, a cup-shape disk in each member, means to feed the material to be concealed into one of the disks, and guides operating to fold one member with its disk over and upon the other disk while the members are being moved.

8. In a machine for filling and sealing conceals, two moving members hinged together and means to move the members, a cup-shape disk in each member, means to feed the material to be concealed into one of the disks, and guides operating to fold one member with its disk over and upon the other disk while the members are being moved and means to return the folded member to its normal position.

9. In a machine for filling and sealing conceals, two members hinged together and moving in one direction, one of the members folding transversely to such movement, disks on said members, means to feed the material to one of the disks, propelling means for said members and additional means to fold one over and upon the other.

10. In a machine for filling and sealing conceals, two disk-supporting members hinged to each other, a conceal-disk in each member, a cap hinged to one of the members and having an aperture, means for folding the cap over and upon one of the disks, a device for feeding the powder to be concealed through the aperture and into the underlying disk, means to unfold the cap, and additional means for automatically folding the other member with its disk over and upon the former disk to complete the conceal.

11. In a machine for filling and sealing conceals, an endless carrier having disk-holding members one folding upon the other, means to feed the disks to said members, a device for moistening one of the disks, a filler for the disk and means coöperating with the movement of the carrier to fold one member with its disk over and upon the other member.

12. In a machine for filling and sealing conceals, the combination of a series of disk-holders connected to form an endless carrier, means for feeding the disks one by one into the carrier, a filler including a powder-feeding device, means to move the carrier and additional means connected to the former means to operate the powder-feed as the disk-holders are successively fed to the filler.

13. A series of holders for the sealed disks linked to each other to form an endless carrier and means to actuate the carrier, each holder having a folding member containing one of the disks, a device for feeding the material to be sealed into one of the disks of each holder, a device for the other disks and means coacting with the moving carrier to fold and unfold the folding members automatically whereby the moistened disks are applied to the filled disks.

14. A series of holders for the sealed disks linked to each other to form an endless carrier and means to actuate the carrier, each holder having a folding member containing one of the disks, a device for feeding the material to be sealed into one of the disks of each holder, a device for the other disks and means coacting with the moving carrier to fold and unfold the folding members automatically whereby the moistened disks are applied to the filled disks and a pressure device for pressing the meeting edges of the disks together.

15. A disk-holder comprising two members hinged to each other, one folding upon the other in combination with means to hold an additional means to fold one member over and upon the other during the movement of the holder.

16. A folding device for conceal-disks comprising two disk-holding members hinged to each other, one folding over and upon the other and an apertured gaging cap or plate hinged to one of the former members and folding over and upon the same to regulate the quantity of material to be discharged into the underlying disk.

17. An endless carrier composed of disk-holders linked to each other, each holder having a gaging-cap adapted to fold over and upon one of the disks, means to move the carrier, a filler, a moistener, devices for actuating the folding members while the carrier is in motion, all of said parts coacting with each other to fill and seal the conceals as described.

In witness whereof I have hereunto set my hand this 12th day of March, 1903.

FRANK ALEXANDER ROBINSON.

Witnesses:
H. E. CHASE,
MILDRED M. NOTT.